US009116818B2

(12) United States Patent
Bilange et al.

(10) Patent No.: US 9,116,818 B2
(45) Date of Patent: Aug. 25, 2015

(54) METHODS AND SYSTEMS FOR RETRIEVING AND CACHING GEOFENCE DATA

(75) Inventors: Eric P. Bilange, San Diego, CA (US); Adam W. Perry-Pelletier, Rancho Penasquitos, CA (US); Gary G. Damm, Ramona, CA (US); Ian R. Heidt, Carlsbad, CA (US); Wendell Ruotsi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 13/484,438

(22) Filed: May 31, 2012

(65) Prior Publication Data

US 2013/0326137 A1    Dec. 5, 2013

(51) Int. Cl.
| | |
|---|---|
| *G01C 21/10* | (2006.01) |
| *G06F 12/08* | (2006.01) |
| *H04W 4/02* | (2009.01) |
| *H04W 4/18* | (2009.01) |
| *H04L 29/08* | (2006.01) |
| *G01C 21/34* | (2006.01) |
| *G01C 21/32* | (2006.01) |

(52) U.S. Cl.
CPC .......... *G06F 12/0866* (2013.01); *H04L 67/04* (2013.01); *H04L 67/289* (2013.01); *H04L 67/2852* (2013.01); *H04W 4/021* (2013.01); *H04W 4/18* (2013.01); *G01C 21/32* (2013.01); *G01C 21/3407* (2013.01); *H04W 4/026* (2013.01); *H04W 4/027* (2013.01)

(58) Field of Classification Search
USPC ....................................................... 701/516
See application file for complete search history.

(56) References Cited

U.S. PATENT DOCUMENTS

| | | | |
|---|---|---|---|
| 7,493,211 B2 | 2/2009 | Breen | |
| 7,536,190 B1 | 5/2009 | Creemer | |
| 8,577,610 B2* | 11/2013 | Shao et al. | 701/537 |
| 2006/0089160 A1* | 4/2006 | Othmer | 455/457 |

(Continued)

FOREIGN PATENT DOCUMENTS

WO    WO-2009155039 A1    12/2009

OTHER PUBLICATIONS

Raghunath Rajachandrasekar et al., "Location-Based Query Processing: Sensing Our Surroundings," Ohio State Univ., sched. presentation Nov. 23, 2010 (actual publication unknown).

(Continued)

*Primary Examiner* — Hussein A. Elchanti
(74) *Attorney, Agent, or Firm* — Gerald P. Joyce, III

(57) ABSTRACT

Mobile device systems and methods for monitoring geofences cache a subset of geofences within a likely travel perimeter determined based on speed and direction of travel, available roads, current traffic, etc. A server may download to mobile devices subsets of geofences within a likely travel perimeter determined based on a threshold travel time possible from a current location given current travel speed, direction and roads. Mobile device may receive a list of local geofences from a server, which may maintain or have access to a database containing all geofences. The mobile device may use the cashed geofences in the normal manner, by comparing its location to the cached list of local geofences to detect matches. In an embodiment, the mobile device may calculate or receive from the server an update perimeter, which when crossed may prompt the mobile device to request an update to the geofences stored in cache.

74 Claims, 6 Drawing Sheets

(56) References Cited

U.S. PATENT DOCUMENTS

2008/0162034 A1   7/2008  Breen
2008/0180320 A1*  7/2008  Tysowski ................. 342/357.09
2008/0186165 A1   8/2008  Bertagna et al.
2010/0153007 A1*  6/2010  Crowley ....................... 701/206
2011/0106431 A1*  5/2011  Tomobe et al. ............... 701/201
2011/0148626 A1   6/2011  Acevedo
2011/0256881 A1  10/2011  Huang et al.
2013/0046893 A1*  2/2013  Hauser et al. ................. 709/226

OTHER PUBLICATIONS

International Search Report and Written Opinion—PCT/US2013/043434—ISAEPO—Apr. 4, 2014.

* cited by examiner

METHODS AND SYSTEMS FOR RETRIEVING AND CACHING GEOFENCE DATA

BACKGROUND

The term "geofence" refers to a set of geographic coordinates defining a location, area or boundary, which when satisfied initiates some associated functionality (e.g., pushing information, sending an alert, etc.) A geofence can be made up of complex polygons or lines between coordinates, and therefore the term "geofence" used in this description may be sets of points or coordinates defining a perimeter, a center point plus a radius, a vector space, etc. with the points being latitude and longitude, a street address, intersections, etc. Geofences may be implemented in a variety of security, advertising, asset tracking, and inventory control applications, and may be implemented in geo-based systems and applications.

SUMMARY

To alleviate the storage and calculation burden on the mobile device, the embodiments herein describe large databases for storing geofence data, such as on a server or a large capacity storage medium connected to the mobile device, and a mechanism to cache within the memory in the mobile device a limited number of geofences which are within a threshold distance of the mobile device.

This cache of "local" geofences may be updated whenever the mobile device moves (i.e., changes locations) or periodically during a transit. To accommodate mobile devices that are moving (e.g., in a car), the method for identifying the geofences for caching may take into account the current direction of travel, speed and other factors, such as ease of various driving routes, so that those geofences within a threshold travel time of the mobile device are cached. In this manner at any point in time, the mobile device may store in memory (i.e., cache) a limited number of geofences that are nearby (e.g., within a threshold distance) the current location of the mobile device. As the mobile device moves, it may receive updates to the geofence cache, such as receiving new set of geofences and purging from the cache those geofences that are too distant (or beyond the threshold travel time) from the current location. In this manner, the most relevant geofences may be retained in memory, enabling the mobile computing device processor to perform entry/exit checks on a limited number of geofences that remain relevant to the mobile device as it moves.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

Figure 1:
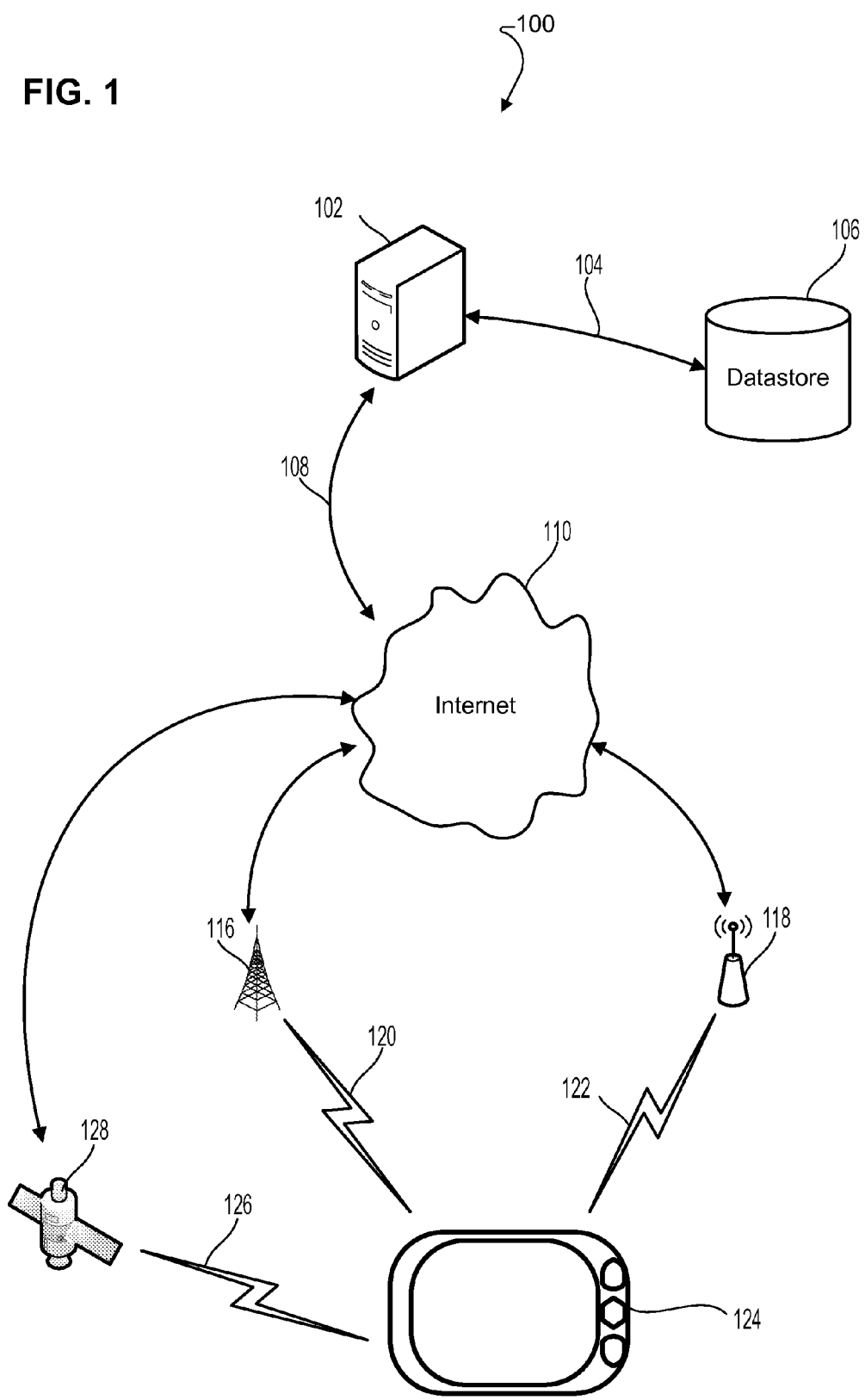
FIG. 1 is a communication system block diagram of an embodiment system.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "smartphone" "mobile computing device" and "mobile device" refer to a variety of computer devices, including but not limited to cellular telephones, mobile computing devices, personal data assistants (PDAs), palm-top computers, multimedia Internet enabled cellular telephones (e.g., the Blackberry Storm®), Global Positioning System (GPS) receivers, receivers within vehicles (e.g., automobiles), notebooks, smartbooks, netbooks, tablets (e.g., Apple®, iPad®, Samsung®, Galaxy®), mobile television devices, wireless modem dongles, computers (e.g., laptop computers) coupled to a wireless modem, computers coupled to a dongle, or other portable programmable computing devices.

It is anticipated that mobile computing devices, such as smartphones, may be configured with applications that interact with location information received from a GPS receiver to provide a variety of services tied to when the device moves into or outside of a geofence. Such services may include, for example, sounding an alarm, receiving and/or displaying an advertisement or promotional coupon, or activating some other functionality of the device. This geofence-activation mechanism may be convenient for applications that track or act upon the device entering, approaching or leaving a location, which are referred to herein as "geofence events." For example, retailers may want to push coupons, promotions, directions, etc. to mobile devices when they enter a geofence, which indicates that the mobile device is close enough or in a location where pushing such advertising to the mobile device is likely to be worth the advertising expense.

Due to the storage and processing limitations on mobile devices, a mobile device can only track a limited number of geofences at a time. This could present a limitation on the usefulness of geofence-activated services in view of the large number of potential geofences that retailers might want to deploy for monitoring by mobile devices. For example, Starbucks might want to establish geofences in the vicinity of their 17,000+ locations, while a major oil company may want to establish geofences in the vicinity of more than 150,000 affiliated gas stations. This example is limited to the United States; globally the number of potential geofences would be significantly greater. Maintaining such a large database on mobile devices would be impractical. Also, most mobile devices may not have sufficient processing power to each of the thousands of geofences in the database during each location update cycle (e.g., each time the mobile device moves or compares its current location to geofences). Further, performing the large number of calculations necessary to compare the current location to a large number of geofences could drastically drain the battery of the mobile device, while occupying much of the processor's capabilities, both of which may impact the user's experience.

The various embodiments enable mechanisms for caching a relevant subset of geofences on a mobile device by calculating a likely travel perimeter based on the speed and direction of travel, available directions of travel (e.g., may be defined by trails, roads, waterways, shopping mall layouts) and current travel and weather conditions, and downloading a subset of the geofences that are relevant to the mobile device based upon a threshold travel time. The likely travel perimeter may define an approximate distance that the mobile device may travel in any direction within a threshold travel time from the current location. The various embodiments enable retrieving and caching a group of geofences that are at least partially within the likely travel perimeter. A mobile device may be configured to receive a list of local geofences from a server and store those geofences in a cache. The mobile device may then use the cashed geofences in the normal manner, by calculating its current location and comparing its location to the cached list of local geofences. If its current location is within one or more cached local geofences, instructions or functionality associated with the satisfied geofences may be executed on the mobile device. Executed instructions may include displaying an advertisement or other message, playing a sound, or otherwise alerting the user of the proximity of the geofence, or sending an SMS or e-mail message to a merchant (for example) informing the merchant that the mobile device has crossed a geofence.

In an embodiment, the mobile device may use a global positioning system (GPS) receiver to determine the device's position. However, position determination may also or alternatively be accomplished via other known mechanisms, such as use of radio signals, cellular signals, WiFi signals or any other technology capable of being interpreted to identify the geographic position of the mobile device.

After receiving a cache download of geofences, the mobile device's movements may cause it to approach the edge of the likely travel perimeter that was used to identify the geofences downloaded in the last update cycle. In an embodiment, as each likely travel perimeter is approached, the mobile device may communicate its current location, direction and speed of travel in a location report transmitted to a server as part of a request for a new update. The server may maintain or have access to the full database of geofences. The server may use the location, and direction and speed of travel information in the received location report to define a new likely travel perimeter. Using that likely travel perimeter, the server may select a subset of geofences for downloading to the requesting mobile device. Alternatively, the mobile device may calculate its own likely travel perimeter and provide the coordinates of that travel perimeter to the server as part of its request for an update. The server may be configured to download geofence data sets in response to queries from many mobile devices, such as a service that is provided to subscribing mobile devices. This process of updating the cached subset of geofences from a server may be repeated whenever the mobile device moves beyond the area addressed by cached subset of geofences.

In another embodiment, the full database of geofences may be maintained on a storage medium periodically accessible by the mobile device (e.g., on a DVD data storage disc or external hard drive memory), in which case the caching of a subset of geofences may be accomplished by copying the subset of geofences from the large capacity data stored to cache memory within the mobile device. In this embodiment, the mobile device may determine the subset of geofences that should be downloaded based on its own location, its direction of travel, and geofence location information included within the full database of geofences.

To reduce the number of times the mobile device must communicate with the server, in an embodiment the server may transmit an update perimeter along with the set of local geofences. The update perimeter may define the geographic limits within which the existing cache of local geofences does not need to be updated. In some situations, the update perimeter may be smaller than the likely travel perimeter. When the mobile device detects that it is near or has crossed an update perimeter the processor in the mobile device may begin the process of requesting an update to the cache of local geofences. When the mobile device moves outside of the update perimeter, the processor may recalculate the likely travel perimeter and update perimeter, transmit the likely travel perimeter to the server and receive a new set of local geofences from the server.

Alternatively, the processor may transmit its current location, direction of travel and velocity in a location report transmitted to the server, which may use that information to calculate the size and shape of the update perimeter based on speed and direction of travel and the density of geofences in the local vicinity. For example, in rural areas where geofences are less dense (i.e., there are fewer geofences per square mile), the update perimeter may be large because the low density of geofences means that the size of the memory cache is the limiting factor on the number of geofences stored in the cache. In other words, when there are few geofences per square mile, the mobile device memory can store geofences encompassing an area much larger than the likely travel perimeter. In contrast, when the geofence density is high, such as may exist in a shopping mall, large city or dense metropolitan area, the number of geofences downloaded to mobile devices may be limited by the size of the cache memory, in which case the update perimeter may be closer in distance than the likely travel perimeter. In some instances, the update perimeter may be within the likely travel perimeter. Another difference between the update perimeter and the likely travel perimeter is that the update parameter may be circular while the likely travel perimeter may be extended along the direction of travel and may be narrowly confined to available travel routes, such as when the mobile device is traveling in an automobile. By beginning the geofence cache update process when the mobile device crosses the update perimeter, the update may be accomplished before the mobile device reaches the limits of the likely travel perimeter.

FIG. 1 illustrates system components and interrelationships between mobile devices and a server according to an embodiment. Mobile devices 124 typically will include a GPS receiver that may determine its position from GPS signals 126 received from a number of GPS satellites 128, and a processor configured to use the position information. The processor in each mobile device 124 may be configured with instructions for calculating its direction and speed of travel based on multiple GPS position reports. The processor in the mobile device 124 may also be configured with executable instructions to analyze its location, speed and direction of travel, available directions of travel (e.g., trails, roads, shopping mall layouts, etc.) and current travel conditions to calculate a likely travel perimeter, as described in more detail below. The processor in the mobile device 124 may be configured with executable instructions to transmit a message containing the likely travel perimeter to a server 102 via one or more communication links such as radio signals 120 or WiFi connections 122 which are in turn connected to the Internet 110. Alternatively, the processor in the mobile device 124 may be configured with executable instructions to transmit its current location, and speed and direction of travel in a request for an update of geofences.

The server 102 may be connected (e.g., via a local network 104) to a data store 106 on which is maintained a large (e.g., global) database of geofences. The server 102 may be configured with executable instructions to receive messages from mobile devices 124, search a global database of geofences maintained on the data store 106 to identify those geofences that are within a likely travel perimeter received from the mobile device, and transmit to the mobile devices subsets of geofences that are at least in part within the likely travel perimeter of each mobile device. Alternatively, the server 102 may be configured with executable instructions to calculate a likely travel perimeter for a mobile device 124 based upon location, speed, and direction information received from the mobile device, and use the calculated likely travel perimeter in identifying the subset of geofences that are downloaded to that mobile device. The server 102 may transmit the subset of geofences to the mobile devices 124 over the Internet 110, via a cellular data network 116 and/or a WiFi network 118.

The processor in the mobile device 124 may be configured with executable instructions to receive the subset of geofences transmitted by the server 102, and favor the received data in local memory (e.g., cache memory) in the mobile device. The processor in the mobile device 124 may be configured with executable instructions to compare its current location against the cached subset of geofences and execute instructions corresponding to each geofence that encompasses its current location.

Figure 2:
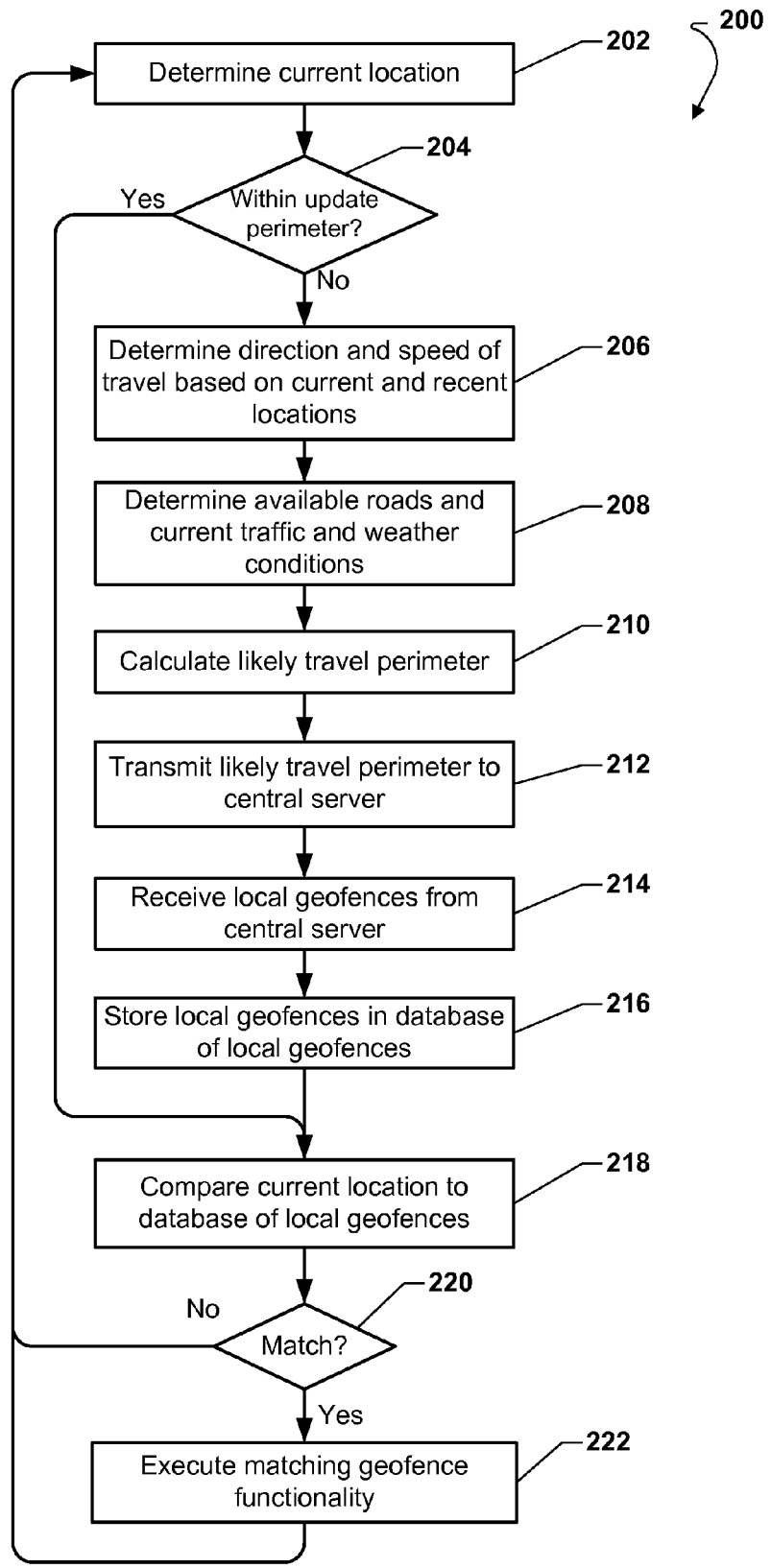
FIG. 2 is an illustration of representations of various shapes of likely travel perimeters.

FIG. 2 illustrates an embodiment method 200 by which a mobile device may calculate its likely travel perimeter, retrieve and cache geofences based upon that likely travel perimeter, and determine if cached geofences are sufficient for its current location, speed and direction of travel. In method 200 in block 202, the mobile device processor may receive its current location from a GPS receiver. Alternatively, its position determination may be accomplished via use of radio signals, cellular signals, and/or WiFi signals. In determination block 204, the mobile device processor may determine whether the current cache of geofence data should be updated. In this determination, the mobile device processor may determine whether the mobile device has moved beyond an update perimeter, has moved more than a threshold distance from the location at which the current cache of geofence data was downloaded, or the mobile device is approaching a boundary of cached geofences. In an embodiment, the mobile device processor may determine that a geofence cache update is appropriate when a majority of the geofences stored in the cache is beyond a threshold travel time from its current location. Other mechanisms for determining that an update of the geofence cache is required may also be implemented in determination block 204.

In an embodiment, the update perimeter may not be an area separate from the likely travel perimeter, but instead may be a zone at the edge of the calculated likely travel perimeter. In this embodiment, that zone may be configured such that when the mobile device enters the update perimeter this event indicates that edge of the likely travel perimeter is being approached, causing the mobile device processor to calculate a new likely travel perimeter and/or request an updated of the geofence cache.

If the mobile device's current location is within the update perimeter (i.e., determination block 204="Yes"), indicating that the mobile device has not moved a sufficient distance since the last geofence update to require an update of the geofence database, in block 218 the current location may be compared to the geofences cached in memory in the mobile device to determine if there is a match. If the current location is within one or more cached geofences (i.e., determination block 220="Yes"), the processor may execute a functionality associated with the matched geofence(s) in block 222. If none of the cached geofences match the current location (i.e., determination block 220="No"), the processor may continue periodically determining the current location of the device in block 202.

If the current location is not within the update perimeter, indicating that the mobile device has traveled far enough since the last geofence update that another is required (i.e., determination block 204="No"), the mobile device processor may estimate its direction and speed of travel based upon the current and previous positions using any suitable algorithm in block 206. This may involve, for example, determining a vector of travel by curve fitting the coordinates from the most recent location fixes (e.g., GPS fixes) with the speed of travel being estimated based on an average or maximum velocity traveled during the period of time encompassing the recent location fixes.

In an embodiment, if the determined velocity exceeds normal walking speed, in block 208 the processor may compare the device's location to map data to determine if the device is in a location where travel directions are constrained. If so, the processor may obtain data from various data sources that may help determine a likely travel perimeter. For example, if the processor determines that the mobile device is traveling over land at velocities exceeding walking, running or biking, the processor reference map data stored in memory to identify available roads near the current location, and external databases, such as traffic and weather databases that may be accessed via a wireless network, to obtain information that can be used to estimate the likely travel perimeter. As another example, if the processor determines that the mobile device is traveling on the water (i.e., the user is on a boat), the processor may access coordinates of the body of water and use those as boundaries of a likely travel perimeter. As a further example, if the processor determines that the mobile device is moving at walking or running pace (e.g., jogging in the park, hiking in the woods or desert, mountain biking, or driving in rush hour traffic), the processor may simply use the current average velocity to define a circular perimeter defined by the average speed times the duration for which the likely travel perimeter is determined (since the user may turn in any direction). Using this data, the processor may calculate a likely travel perimeter based on the determined direction of travel, speed of travel, available directions of travel (e.g., roads) and travel conditions (e.g., traffic and weather conditions) in block 210.

In block 212, the processor in the mobile devices may transmit a message containing the likely travel perimeter to a server. The server may receive the likely travel perimeter from the mobile device, and return a new set of local geofences using the process illustrated in FIG. 4.

In an alternative embodiment, instead of the mobile device processor calculating its likely travel perimeter in block 210, the mobile device may report its location, speed and direction of travel in one or a series of location reports transmitted to the server, and the server may use that information to calculate a likely travel perimeter for the mobile device. As discussed above, the server may calculate the likely travel perimeter for the mobile device using the received location, speed and direction of travel information in combination with other information that may be known to the server, such as current traffic and whether conditions. Thus, the operations in block 210 may be performed within the mobile device or the server based on information provided to it by the mobile device.

Referring to FIG. 2, in block 214 the mobile device processor may receive the subset of geofences within the likely travel perimeter from the server, and store the information in cache memory of the mobile device in block 216. The processor may proceed as described above to compare the current location to the geofences cached in the mobile device in block 218, look for matching geofences in block 220, and execute functionality corresponding to any matching geofence(s) in block 222.

As mentioned above, calculations of the direction and speed of travel of the mobile device, identification of constraints on directions of travel (e.g., local roads, trails or waterways), current travel conditions (e.g., traffic and weather conditions), calculations of the likely travel perimeter, and identifying the subset of geofences to cache in the mobile device may be accomplished in a server (based on position reporting from the mobile device). In a further embodiment, these calculations and determinations may be accomplished partly in the server and partly in the mobile device. When accomplished entirely in the server, the mobile device may periodically send its location in a series of location reports transmitted to the server, and receive a geofence cache download sent by the server when the server determines that an update is appropriate. In this embodiment, the server may use the periodic location reports to estimate a direction and speed of travel of the mobile device, and the server may access map data, weather and traffic reports for the current location of the mobile device. Using this information, the server may apply an algorithm to identify a likely travel perimeter or otherwise identify a subset of geofences to download, and then push the selected subset of geofences to the mobile device via an available communication link.

In embodiments in which mobile device and server perform operations to periodically update the geofence cache, the mobile device may determine its own travel direction and speed, and travel direction constraints and conditions (e.g., locally available roads and traffic conditions), and send this information to the server. The mobile device processor may also use its travel direction and speed, and travel constraints (e.g., locally available walkways, trails, roads or waterways as well as traffic conditions) to calculate its own likely travel perimeter, which it may send to the server. In this embodiment, the server may use either the received travel direction and speed or the likely travel perimeter values to select the subset of geofences to send to the mobile device.

The term "likely travel perimeter" is meant to encompass any mechanism or parameter for determining a subset of geofences that should be cached in the mobile device at any given time. In the various embodiments, a perimeter may be calculated to identify geofences that could potentially be entered/satisfied within a predefined period of time based on the current travel speed and direction, and local travel constraints (e.g., locally available roads, traffic and weather conditions). For example, any geofences that are within 15 minutes travel time from the current location based on current direction and speed, including opportunities to turn or turn around, may be within a likely travel perimeter based upon the travel time of 15 minutes. Further mechanisms for calculating a likely travel perimeter are described below.

The selection of a subset of geofences to be downloaded to a mobile device may be based on other criteria related to the current position of the mobile device. In an embodiment, the subset of geofences to be downloaded may include all geofences within the likely travel perimeter, plus all geofences within a predefined radius (which may be greater than the likely travel perimeter, especially if the user is walking). For example, the subset of geofences to be downloaded may include geofences within 1, 2 or 5 miles of the current location, regardless of the current speed or direction of travel. In another embodiment, the travel time parameter used to generate the likely travel perimeter may vary depending upon the type of geofence or merchant employing geofences. This embodiment may accommodate differences in the offer presented in the geofences or relevance of their associated information or advertising. As another example, the subset of geofences to be downloaded might include all 7-11® store geofences within 2 miles, all Starbucks® geofences within 5 miles, and all Wal-Mart® stores within 20 miles. Such relevance-distance criteria may be defined by the merchants paying to have their geofences included in the database, and may be based upon their own marketing strategies and customer knowledge. Further, the provider or sponsor of each geofence may define other subset-selection criteria suitable for their own advertising purposes, in addition to the variable radius values in the preceding example.

Figure 3:
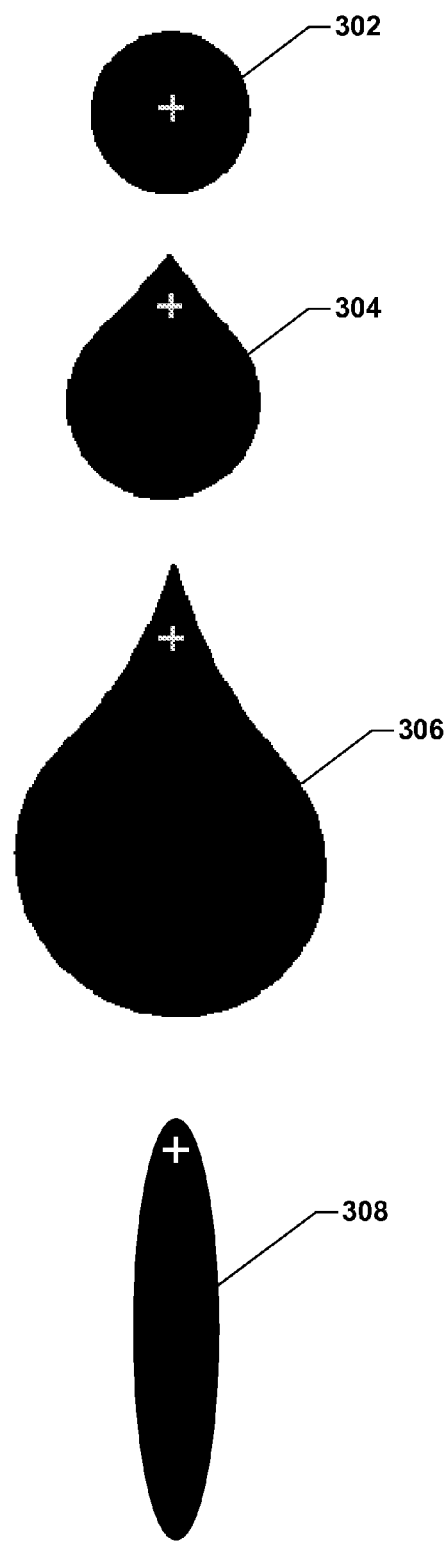
FIG. 3 is a process flow diagram of an embodiment method for calculating a likely travel perimeter, retrieving and caching geofences based upon the likely travel perimeter, and determining whether geofences should be purged from the cache based on the current location, speed and direction of travel.

Referring to FIG. 3, four illustrations of likely travel perimeters are shown. In each illustration, the white cross indicates the current location of the mobile device at the time that the likely travel perimeter is calculated, and the black area represents the likely travel perimeter from the current location as calculated based on the current speed and direction of travel. For example, likely travel perimeter 302 is nearly circular about the current location of the mobile device. The processor might define a nearly circular likely travel perimeter 302 when the mobile device is traveling at low speed, such as when the user is walking, biking or driving in a city with accessible roads in all directions. Thus, the radius of the circular likely travel perimeter 302 may be the distance that a user could travel within the predefined travel time walking, biking or driving in city traffic.

In a further embodiment, the radius of such a circular likely travel perimeter 302 may be determined by the processor based on how fast the device is moving and on the density of geofences in the area. For example, if the measured travel speed is consistent with a user walking and the mobile device is located in a large city (e.g., Manhattan), the radius of the likely travel perimeter 302 may be smaller than it would otherwise have been if the user was walking in a small town, because there are far more geofences available in a large city than in a small town. In a large city, the processor may reduce the size of the likely travel perimeter in order to reduce the number of geofences that are stored in memory consistent with the size of the memory, and to limit processing demands from caching a larger number of geofences. In a smaller town, on the other hand, there would likely be fewer geofences in the area, so all of the geofences within the pre-defined travel time may be stored in memory without exceeding memory capacity or placing an inordinate demand on the processor.

As the travel speed of the mobile device increases, the likely travel perimeter may be distorted in the direction of travel. Example likely travel perimeter 304 features a slightly elongated shape parallel to the direction of travel, consistent with the mobile device moving faster, but in an area in which the user may turn in other directions at any time. Example likely travel perimeter 306 features an even more elongated shape, consistent with a faster speed of travel in an area where the user has fewer opportunities to deviate course in either direction along the direction of travel. Example likely travel perimeter 308 features a significant distortion in the direction of travel consistent with the mobile device traveling at relatively high speed in a location (e.g., a major freeway) where there are no opportunities to change direction of travel (e.g., no off ramps for several miles). For example, the shape of example likely travel perimeter 308 might result from the user driving on a limited access highway where there is no opportunity to stop, proceed in the opposite direction, or exit the highway onto a cross street.

In an embodiment, an update perimeter for determining when a new subset of geofences should be downloaded to a mobile device may be adjusted in a matter similar to that illustrated in FIG. 3. Thus, if a mobile device is traveling at highway speeds, the update perimeter may be increased in the direction of travel so that a new download may be requested and transmitted only infrequently so long as the mobile device continues traveling in the same direction, but may be updated very soon after the mobile device reverses direction, which would indicate that the user has turned around.

In a further embodiment, the mobile devices may cache more or fewer geofences based on the density and distribution of the geofences. In this additional embodiment, in addition to caching geofences that are nearby and caching geofences based on the velocity and direction of travel, the mobile device may also cache more or fewer geofences depending on the relative density of geofences in the area. In this manner, the cache of geofences may encompass a much larger geographic perimeter when the density of geofences is low (e.g., in Montana), while the perimeter encompassing cached geofences may be smaller to accommodate memory and processor limitations when the density of geofences is high (e.g., in New York City). Thus, when traveling through areas of relatively few geofences, the downloading of new geofence caches may be accomplished less frequently than in areas of high geofence density. As discussed above, as the mobile device moves and asks the server to update its geofence cache, the server may also indicate the radius/distance of the update perimeter that the mobile device must travel before another update is requested. In a big city, this distance may be small, while when driving across a desert the distance to travel before an update is required maybe quite far. This embodiment may be implemented by the server configured to set an update perimeter that represents the perimeter (and shape) within which the device does not have to check for updates. When the device approaches or crosses the update perimeter, the processor may ask the server for a new set of geofences, which may be provided along with a refreshed update perimeter. In order for the server to calculate the right virtual geofence, the mobile device may transmit to the server contextual information along with its update requests, such as its current and past velocity and history of positions.

In a further embodiment, the shape and size of the likely travel perimeter may be determined by referencing street maps and current traffic conditions. For example, instead of simply elongating the perimeter proportionate to speed in the direction of travel, the server or mobile device may determine the probable distance that may be traveled in any direction within a threshold time based on the available roads and current traffic conditions. Thus, if the mobile devices is traveling at 50 miles per hour on a two lane road with intersecting roads, the calculated likely travel perimeter may have a shape that is slightly elongated in the direction of travel, but that also extends to each side of the travel direction as well as extending in the opposite direction to account for the possibility that the driver may turn in any other direction, including coming around. In contrast, when the mobile device is traveling at 50 miles per hour on a divided, limited access highway, the calculated likely travel perimeter may extend further in the direction of travel and at times may not extend to either side of the direction of travel or opposite the direction of travel, for example when the driver is not approaching an exit and there is no opportunity to turn around or drive in any direction other than the direction of the highway. Thus, the shape or contour of the likely travel perimeter, which defines the subset of geofences downloaded to a mobile device, may depend on the speed and direction of travel and the local geography, particularly the road local networks which may limit the direction of travel available to a mobile device user for the time period used to determine the likely travel perimeter.

Figure 4:
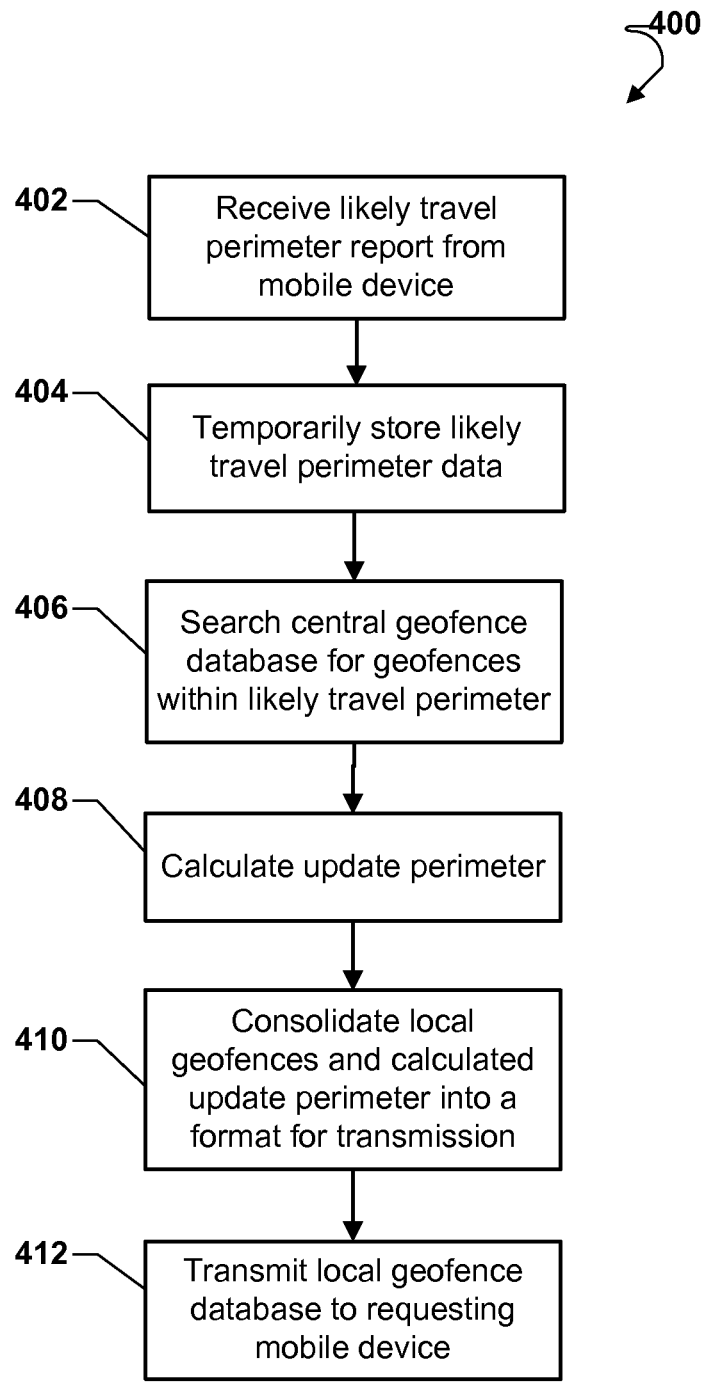
FIG. 4 is a process flow diagram of an embodiment method for receiving and temporarily storing a likely travel perimeter report from a mobile computing device, comparing the likely travel perimeter to stored geofences, consolidating a subset of local geofences and update perimeter, and transmitting a message to the mobile computing device.

FIG. 4 illustrates an embodiment method for a server to receive a likely travel perimeter report from a mobile computing device, search the central database of geofences, and transmit an updated set of local geofences and an update perimeter to the mobile computing device. In method 400 in block 402, the server processor may receive a report from a mobile computing device containing the likely travel perimeter that the mobile computing device has calculated around its current position. Alternatively, the server processor may receive the current location, speed and direction of travel of the mobile computing device. In a further embodiment mentioned above, in block 402 the server may receive a series of position reports from the mobile device, and from those position reports, estimate the speed and direction of the travel of the mobile device. In embodiments in which the server receives or calculates travel speed and direction, the server may calculate a likely travel perimeter based on the data received from the mobile device, any constraints on travel in the vicinity (e.g., the available pathways, walkways, roads or waterways in the vicinity of the direction of travel), and local travel conditions (e.g., current traffic and weather conditions). As mentioned above, the likely travel perimeter may be based on a pre-defined travel time assuming current travel conditions, and the pre-defined travel time may be defined by the sponsor of each geofence. In block 404, the server processor may store the likely travel perimeter, and in block 406, search a large geofence database to identify a set of geofences that are within the received or calculated likely travel perimeter. As mentioned above, the selection of geofences may also include geofences within a pre-set radius of the current location (or other arbitrary selection criteria) if so requested by the geofence sponsor.

In an embodiment, in block 408 the server processor may calculate an update perimeter that defines the distance the mobile device may travel before it requests the next update to the cache of local geofences. The dimension (e.g., radius or boundary coordinates) of the update perimeter may be defined based on a variety of factors including the density of nearby geofences that are outside of the current likely travel perimeter, the travel speed of the mobile computing device, the time required to accomplish a geofence cache update, and the network transmission speed in the vicinity or along the route of travel. If there are many nearby geofences just outside of the current likely travel perimeter, or if the network transmission speed is slow, it will take longer to transmit the next set of geofences to the mobile computing device. In such circumstances, the diameter of the update perimeter may be limited in order to provide sufficient time to complete the next update before the geofences are encountered. By specifying a smaller update perimeter, the server will have more time to transmit the next updated set of local geofences before the mobile computing device reaches the edge of the current likely travel perimeter.

In an alternative embodiment, a separate update perimeter may not be calculated. The update perimeter may instead be a zone near the edge of the calculated likely travel perimeter which serves to trigger the mobile computing device to begin the process of calculating a new likely travel perimeter and transmitting the new likely travel perimeter to the server as described above. The size of the update perimeter zone may be determined by the density of geofences in the vicinity of the mobile device, the travel speed of the mobile device, and other factors, such as the time required to perform a geofence update (which may depend on local network capabilities). As mentioned above, the update perimeter may be sized based upon the local density of geofences. However, the update parameter may also depend upon the travel speed of the mobile device and the time required for the server to complete a geofence update to the mobile device in its current location. Thus, if the mobile device is located in an area where network conditions limit the data transmission rate, the radius of the update parameter may be less than it would otherwise be if a high-speed wireless data network (e.g., 4G or LTE) were available.

In block 410, the server may combine the set of local geofences and the update perimeter or update perimeter zone into a format suitable for transmission to the mobile computing device. This message may be transmitted to the mobile computing device in block 412 via any available wireless communication network.

Figure 5:
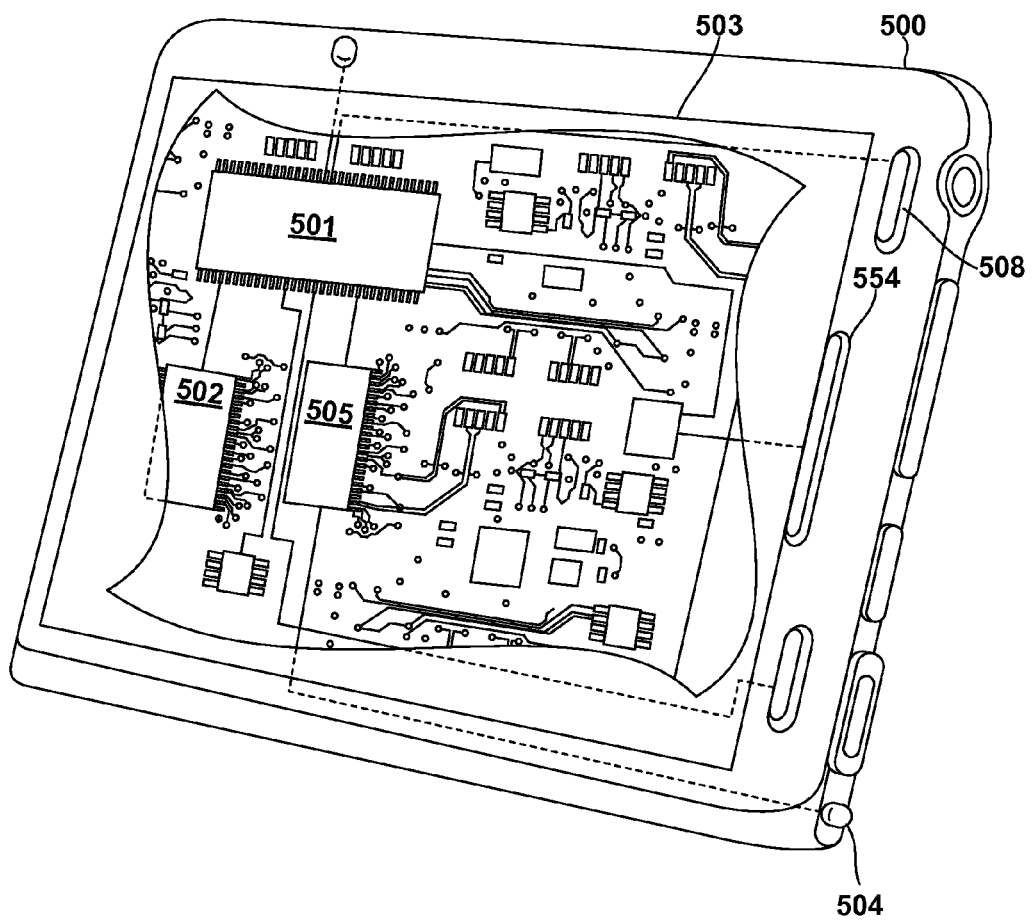
FIG. 5 is a complement block diagram of a mobile computing device suitable for use with the various embodiments.

The various embodiments may be implemented on any of a variety of mobile computing devices. FIG. 5 is a system block diagram of a mobile device, such as a smartphone suitable for use with any of the embodiments. A typical mobile device 500 may include a processor 501 coupled to internal memory 502, a display 503, and to a speaker 554. Additionally, the mobile device 500 may include an antenna 504 for sending and receiving electromagnetic radiation that may be connected to a wireless data link and/or cellular telephone transceiver 505 coupled to the processor 501. Mobile devices 500 typically also include one or more menu selection buttons 508 or switches for receiving user inputs.

The processor 501 may be any programmable microprocessor, microcomputer or multiple processor chip or chips that can be configured by software instructions (applications) to perform a variety of functions, including the functions of the various aspects described above. In some devices, multiple processors 501 may be provided, such as one processor dedicated to wireless communication functions and one processor dedicated to running other applications. Typically, software applications and data may be stored in the internal memory 502 before they are accessed and loaded into the processor 501. The processor 501 may include internal memory sufficient to store the application software instructions. In many devices the internal memory may be a volatile or nonvolatile memory, such as flash memory, or a mixture of both. For the purposes of this description, a general reference to memory refers to memory accessible by the processor 501, including internal memory or removable memory plugged into the device and memory within the processor 501 itself.

Figure 6:
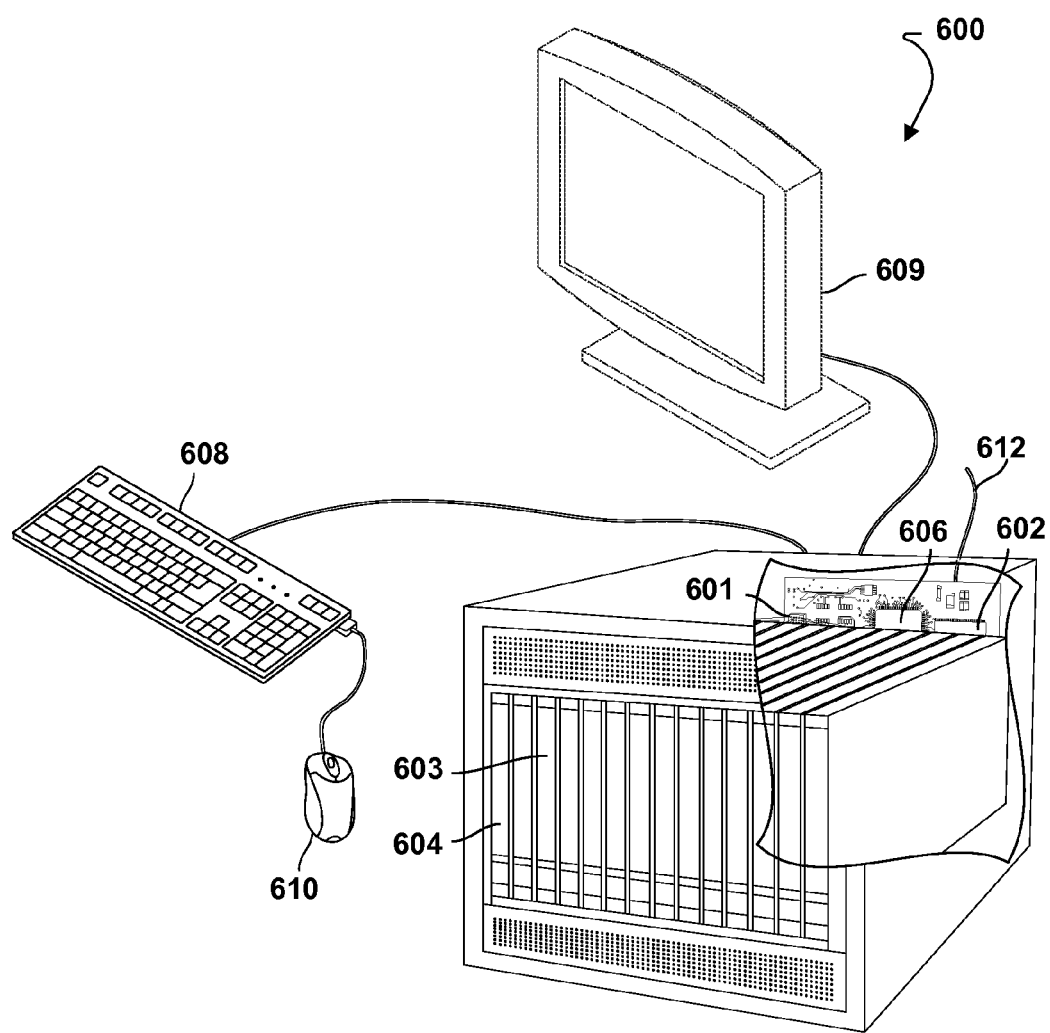
FIG. 6 is a component block diagram of a server suitable for use in the various embodiments.

The various embodiments may be implemented on any of a variety of commercially available servers, such as the server illustrated in FIG. 6. A server 600 typically includes a processor 601 coupled to volatile memory 602 and a large capacity nonvolatile memory, such as a disk drive 603. The server 600 may also include a floppy disc drive, compact disc (CD) or DVD disc drive 604 coupled to the processor 601. The server 600 may also include network access ports 606 coupled to the processor 601 for establishing data connections with a network 612, such as a local area network coupled to other broadcast system computers and servers. Servers 600 may also include operator interfaces, such as a keyboard 608, pointer device (e.g., a computer mouse 610), and a display 609.

The foregoing method descriptions and the process flow diagrams are provided merely as illustrative examples and are not intended to require or imply that the operations or steps of the various aspects must be performed in the order presented. As will be appreciated by one of skill in the art the order of blocks in the foregoing aspects may be performed in any order. Words such as "thereafter," "then," "next," etc. are not intended to limit the order of the operations or steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The aspect methods described herein may be implemented in a computing device by configuring a processor of the computing device with processor-executable instructions to perform the operations of the method. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the operations and functions described may be implemented in hardware, software, firmware, or any combination thereof. If implemented in software, the functions may be stored on as one or more instructions or code on a non-transitory processor-readable storage medium or server-readable storage medium. The operations of a method or algorithm disclosed herein may be embodied in a processor-executable software module that may be stored on a non-transitory processor-readable storage medium or server-readable storage medium. Non-transitory server-readable and processor-readable media may be any available storage media that may be accessed by a server or processor. By way of example, and not limitation, such non-transitory processor-readable or server-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a processor or server. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory processor-readable storage medium or server-readable storage medium. Additionally, the operations of a method or algorithm may reside as one or any combination or set of codes and/or instructions on a non-transitory processor-readable storage medium or server-readable storage medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for enabling a mobile computing device to monitor geofences, comprising:
    determining a current location of the mobile computing device;
    receiving a subset of geofences from a global database of geofences based upon the current location of the mobile computing device and an update perimeter that defines a distance of travel for the mobile computing device before requesting the subset of geofences be updated;
    caching the subset of geofences in memory of the mobile computing device;
    comparing the current location to the subset of geofences cached on the mobile computing device to determine if a geofence criterion is satisfied;
    executing an instruction associated with each geofence in the subset of geofences that satisfies the geofence criterion; and
    transmitting a request for an updated subset of geofences when the current location is near or beyond the update perimeter.

2. The method of claim 1, wherein the subset of geofences is based upon the current location of the mobile computing device; and
    wherein caching the subset of geofences in memory of the mobile computing device comprises storing the received transmitted subset of geofences in cache memory of the mobile computing device.

3. The method of claim 1, further comprising:
    determining a speed and direction of travel of the mobile computing device, and
    wherein the subset of geofences is based upon the current location of the mobile computing device and the determined speed and direction of travel of the mobile computing device.

4. The method of claim 3, further comprising:
    calculating a likely travel perimeter from the current location and direction and speed of travel, and
    wherein the subset of geofences is at least partially encompassed within the calculated likely travel perimeter.

5. The method of claim 4, wherein calculating the likely travel perimeter comprises calculating a distance in each direction that the mobile device is likely to travel within a predefined period of time based on the direction and speed of travel.

6. The method of claim 5, wherein calculating the likely travel perimeter further comprises evaluating constraints on directions of travel and travel conditions in the vicinity of the current location in calculating the distance in each direction that the mobile device is likely to travel within the predefined period of time.

7. The method of claim 5, wherein calculating the likely travel perimeter further comprises calculating the distance in each direction that the mobile device is likely to travel within a predefined period of time that is predefined for each geofence.

8. The method of claim 3, further comprising:
    transmitting a sequence of location information over a period of time to a server, and
    wherein determining a speed and direction of travel of the mobile computing device is based on the received sequence of location information.

9. The method of claim 1, further comprising:
    receiving the updated subset of geofences in response to the request for the updated subset of geofences.

10. The method of claim 1, wherein the subset of geofences is selected based in part on a number or density of geofences in the vicinity of the current location of the mobile computing device.

11. A method for enabling a server to manage geofences, the method, comprising:
    receiving a current location of a mobile computing device;
    selecting a subset of geofences from a global database of geofences based upon the current location of the mobile computing device;
    calculating an update perimeter that defines a distance of travel for the mobile computing device before requesting the subset of geofences be updated; and
    transmitting the selected subset of geofences, instructions associated with each geofence in the subset of geofences to the mobile computing device, and the update perimeter.

12. The method of claim 11, wherein selecting the subset of geofences is based on the current location and a speed and direction of travel of the mobile computing device.

13. The method of claim 12, further comprising: calculating a likely travel perimeter from the current location and direction and speed of travel, and
    wherein the subset of geofences is at least partially encompassed within the calculated likely travel perimeter.

14. The method of claim 13, wherein calculating the likely travel perimeter further comprises calculating a distance in each direction that the mobile device is likely to travel within a predefined period of time based on the direction and speed of travel.

15. The method of claim 14, wherein calculating the likely travel perimeter further comprises evaluating constraints on directions of travel and travel conditions in the vicinity of the current location in calculating the distance in each direction that the mobile device is likely to travel within the predefined period of time.

16. The method of claim 14, wherein calculating the likely travel perimeter further comprises calculating the distance in each direction that the mobile device is likely to travel within a predefined period of time that is predefined for each geofence.

17. The method of claim 12,
receiving a sequence of location reports from the mobile device over a period of time, and
wherein determining the speed and direction of travel of the mobile computing device is based on the received sequence of location reports.

18. The method of claim 11,
receiving a request for an updated subset of geofences when the current location is near or beyond an update perimeter, and
wherein transmitting the selected subset of geofences to the mobile computing device is in response to receiving the request for the updated subset of geofences from the mobile computing device.

19. The method of claim 11, wherein selecting the subset of geofences based in part on a number or a density of geofences in the vicinity of the current location of the mobile computing device.

20. A mobile computing device, comprising:
a memory;
a transceiver; and
a processor coupled to the memory and the transceiver, and configured with processor-executable instructions to perform operations comprising:
determining a current location of the mobile computing device;
receiving a subset of geofences from a global database of geofences based upon the current location of the mobile computing device and an update perimeter that defines a distance of travel for the mobile computing device before requesting the subset of geofences be updated;
caching the subset of geofences in the memory;
comparing the current location to the geofences cached on the mobile computing device to determine if a geofence criterion is satisfied;
executing an instruction associated with each geofence in the subset of geofences that satisfies the geofence criterion; and
transmitting a request for an updated subset of geofences when the current location is near or beyond the update perimeter.

21. The mobile computing device of claim 20, wherein the processor is configured with processor-executable instructions to perform operations further comprising:
determining a speed and direction of travel of the mobile computing device; and
transmitting the speed and direction of travel of the mobile computing device to a server.

22. The mobile computing device of claim 20, wherein the processor is configured with processor-executable instructions to perform operations further comprising:
determining a speed and direction of travel of the mobile computing device;
calculating a likely travel perimeter from the current location and direction and speed of travel of the mobile computing device; and
transmitting the likely travel perimeter to a server.

23. The mobile computing device of claim 22, wherein the processor is configured with processor-executable instructions to perform operations such that calculating the likely travel perimeter comprises calculating a distance in each direction that the mobile device is likely to travel within a predefined period of time based on the direction and speed of travel.

24. The mobile computing device of claim 23, wherein the processor is configured with processor-executable instructions to perform operations such that calculating the likely travel perimeter further comprises evaluating constraints on directions of travel and travel conditions in the vicinity of the current location in calculating the distance in each direction that the mobile device is likely to travel within the predefined period of time.

25. The mobile computing device of claim 23, wherein the processor is configured with processor-executable instructions to perform operations such that calculating the likely travel perimeter further comprises calculating the distance in each direction that the mobile device is likely to travel within a predefined period of time that is predefined for each geofence.

26. The mobile computing device of claim 20, wherein the processor is configured with processor-executable instructions to perform operations further comprising:
receiving the updated subset of geofences in response to the request for the updated subset of geofences.

27. A mobile computing device, comprising:
means for determining a current location of the mobile computing device;
means for receiving a subset of geofences from a global database of geofences based upon the current location of the mobile computing device and an update perimeter that defines a distance of travel for the mobile computing device before requesting the subset of geofences be updated;
means for caching the subset of geofences on the mobile device;
means for comparing the current location to the geofences cached on the mobile computing device to determine if a geofence criterion is satisfied;
means for executing an instruction associated with each geofence in the subset of geofences that satisfies the geofence criterion; and
means for transmitting a request for an updated subset of geofences when the current location is near or beyond the update perimeter.

28. The mobile computing device of claim 27, further comprising:
means for determining a speed and direction of travel of the mobile computing device; and
means for transmitting the speed and direction of travel of the mobile computing device to a server.

29. The mobile computing device of claim 27, further comprising:
means for determining a speed and direction of travel of the mobile computing device;
means for calculating a likely travel perimeter from the current location and direction and speed of travel of the mobile computing device; and
means for transmitting the likely travel perimeter to a server.

30. The mobile computing device of claim 29, wherein means for calculating the likely travel perimeter comprises means for calculating a distance in each direction that the mobile device is likely to travel within a predefined period of time based on the direction and speed of travel.

31. The mobile computing device of claim 30, wherein means for calculating the likely travel perimeter further comprises means for evaluating constraints on directions of travel and travel conditions in the vicinity of the current location in calculating the distance in each direction that the mobile device is likely to travel within the predefined period of time.

32. The mobile computing device of claim 30, wherein means for calculating the likely travel perimeter further comprises means for calculating the distance in each direction that the mobile device is likely to travel within a predefined period of time that is predefined for each geofence.

33. The mobile computing device of claim 27, further comprising:
means for receiving the updated subset of geofences in response to the request for the updated subset of geofences.

34. A non-transitory processor-readable storage medium having stored thereon processor-executable instructions configured to cause a mobile computing device processor to perform operations comprising:
determining a current location of the mobile computing device;
receiving a subset of geofences from a global database of geofences based upon the current location of the mobile computing device and an update perimeter that defines a distance of travel for the mobile computing device before requesting the subset of geofences be updated;
caching the subset of geofences on the mobile computing device; comparing the current location to the geofences cached on the mobile computing device to determine if a geofence criterion is satisfied;
executing an instruction associated with each geofence in the subset of geofences that satisfies the geofence criterion; and
transmitting a request for an updated subset of geofences when the current location is near or beyond the update perimeter.

35. The non-transitory processor-readable storage medium of claim 34, wherein the stored processor-executable instructions are configured to cause a mobile computing device processor to perform operations further comprising:
determining a speed and direction of travel of the mobile computing device; and
transmitting the speed and direction of travel of the mobile computing device to a server.

36. The non-transitory processor-readable storage medium of claim 34, wherein the stored processor-executable instructions are configured to cause a mobile computing device processor to perform operations further comprising:
determining a speed and direction of travel of the mobile computing device;
calculating a likely travel perimeter from the current location and direction and speed of travel of the mobile computing device; and
transmitting the likely travel perimeter to a server.

37. The non-transitory processor-readable storage medium of claim 36, wherein the stored processor-executable instructions are configured to cause a mobile computing device processor to perform operations such that calculating the likely travel perimeter comprises calculating a distance in each direction that the mobile device is likely to travel within a predefined period of time based on the direction and speed of travel.

38. The non-transitory processor-readable storage medium of claim 37, wherein the stored processor-executable instructions are configured to cause a mobile computing device processor to perform operations such that calculating the likely travel perimeter further comprises evaluating constraints on directions of travel and travel conditions in the vicinity of the current location in calculating the distance in each direction that the mobile device is likely to travel within the predefined period of time.

39. The non-transitory processor-readable storage medium of claim 37, wherein the stored processor-executable instructions are configured to cause a mobile computing device processor to perform operations such that calculating the likely travel perimeter further comprises calculating the distance in each direction that the mobile device is likely to travel within a predefined period of time that is predefined for each geofence.

40. The non-transitory processor-readable storage medium of claim 34, wherein the stored processor-executable instructions are configured to cause a mobile computing device processor to perform operations further comprising:
receiving the updated subset of geofences in response to the request for the updated subset of geofences.

41. A server, comprising:
a server processor configured with server-executable instructions to perform operations comprising:
receiving a current location of a mobile computing device;
selecting the subset of geofences from the global database of geofences based upon the current location of the mobile computing device;
calculating an update perimeter that defines a distance of travel for the mobile computing device before requesting the subset of geofences be updated; and
transmitting the selected subset of geofences, instructions associated with each geofence in the subset of geofences to the mobile computing device, and the update perimeter.

42. The server of claim 41, wherein the server processor is configured with server executable instructions to perform operations such that transmitting the selected subset of geofences to the mobile computing device comprises transmitting the selected subset of geofences to the mobile computing device in response to receiving a request for an updated subset of geofences from the mobile computing device.

43. The server of claim 41, wherein the server processor is configured with server executable instructions to perform operations further comprising:
receiving a sequence of mobile computing device location reports; and
determining a speed and direction of travel of the mobile computing device based on the received series of mobile computing device location reports,
wherein the server processor is configured with server executable instructions to perform operations such that selecting the subset of geofences from a global database of geofences based upon the current location of the mobile computing device comprises selecting the subset of geofences based on the current location, and the determined speed and direction of travel of the mobile computing device.

44. The server of claim 41, wherein the server processor is configured with server executable instructions to perform operations further comprising calculating a likely travel perimeter from the current location and direction and speed of travel,
wherein the server processor is configured with server executable instructions to perform operations such that selecting the subset of geofences based on the determined speed and direction of travel of the mobile computing device comprises selecting a subset of geofences that are at least partially encompassed within the calculated likely travel perimeter.

45. The server of claim 44, wherein the server processor is configured with server executable instructions to perform operations such that calculating the likely travel perimeter comprises calculating a distance in each direction that the mobile device is likely to travel within a predefined period of time based on the direction and speed of travel.

46. The server of claim 45, wherein the server processor is configured with server executable instructions to perform operations such that calculating the likely travel perimeter further comprises evaluating constraints on directions of travel and travel conditions in the vicinity of the current location in calculating the distance in each direction that the mobile device is likely to travel within the predefined period of time.

47. The server of claim 45, wherein the server processor is configured with server executable instructions to perform operations such that calculating the likely travel perimeter further comprises calculating the distance in each direction that the mobile device is likely to travel within a predefined period of time that is predefined for each geofence.

48. A server, comprising:
   means for receiving a current location of a mobile computing device;
   means for selecting the subset of geofences from the global database of geofences based upon the current location of the mobile computing device;
   means for calculating an update perimeter that defines a distance of travel for the mobile computing device before requesting the subset of geofences be updated; and
   means for transmitting the selected subset of geofences, instructions associated with each geofence in the subset of geofences to the mobile computing device, and the update perimeter.

49. The server of claim 48, wherein means for transmitting the selected subset of geofences to the mobile computing device comprises means for transmitting the selected subset of geofences to the mobile computing device in response to receiving a request for an updated subset of geofences from the mobile computing device.

50. The server of claim 48, wherein the server processor is configured with server executable instructions to perform operations further comprising:
   means for receiving a sequence of mobile computing device location reports; and
   means for determining a speed and direction of travel of the mobile computing device based on the received series of mobile computing device location reports,
   wherein means for selecting a subset of geofences from a global database of geofences based upon the current location of the mobile computing device comprises means for selecting the subset of geofences based on the current location, and the determined speed and direction of travel of the mobile computing device.

51. The server of claim 48, further comprising means for calculating a likely travel perimeter from the current location and direction and speed of travel,
   wherein means for selecting the subset of geofences based on the determined speed and direction of travel of the mobile computing device comprises means for selecting a subset of geofences that are at least partially encompassed within the calculated likely travel perimeter.

52. The server of claim 51, wherein means for calculating the likely travel perimeter comprises means for calculating a distance in each direction that the mobile device is likely to travel within a predefined period of time based on the direction and speed of travel.

53. The server of claim 52, wherein means for calculating the likely travel perimeter further comprises means for evaluating constraints on directions of travel and travel conditions in the vicinity of the current location in calculating the distance in each direction that the mobile device is likely to travel within the predefined period of time.

54. The server of claim 52, wherein means for calculating the likely travel perimeter further comprises means for calculating the distance in each direction that the mobile device is likely to travel within a predefined period of time that is predefined for each geofence.

55. A non-transitory server-readable storage medium having stored thereon server-executable instructions configured to cause a server to perform operations comprising:
   receiving a current location of a mobile computing device;
   selecting the subset of geofences from the global database of geofences based upon the current location of the mobile computing device;
   calculating an update perimeter that defines a distance of travel for the mobile computing device before requesting the subset of geofences be updated; and
   transmitting the selected subset of geofences, instructions associated with each geofence in the subset of geofences to the mobile computing device, and the update perimeter.

56. The non-transitory server-readable storage medium of claim 55, wherein the stored server-executable instructions are configured to cause a server to perform operations such that transmitting the selected subset of geofences to the mobile computing device comprises transmitting the selected subset of geofences to the mobile computing device in response to receiving a request for an updated subset of geofences from the mobile computing device.

57. The non-transitory server-readable storage medium of claim 55, wherein the stored server-executable instructions are configured to cause a server to perform operations further comprising:
   receiving a sequence of mobile computing device location reports; and
   determining a speed and direction of travel of the mobile computing device based on the received series of mobile computing device location reports,
   wherein the stored server-executable instructions are configured to cause a server to perform operations such that selecting the subset of geofences from a global database of geofences based upon the current location of the mobile computing device comprises selecting the subset of geofences based on the current location, and the determined speed and direction of travel of the mobile computing device.

58. The non-transitory server-readable storage medium of claim 55, wherein the stored server-executable instructions are configured to cause a server to perform operations further comprising calculating a likely travel perimeter from the current location and direction and speed of travel,
   wherein the stored server-executable instructions are configured to cause a server to perform operations such that selecting the subset of geofences based on the determined speed and direction of travel of the mobile computing device comprises selecting a subset of geofences that are at least partially encompassed within the calculated likely travel perimeter.

59. The non-transitory server-readable storage medium of claim 58, wherein the stored server-executable instructions are configured to cause a server to perform operations such that calculating the likely travel perimeter comprises calculating a distance in each direction that the mobile device is likely to travel within a predefined period of time based on the direction and speed of travel.

60. The non-transitory server-readable storage medium of claim 59, wherein the stored server-executable instructions are configured to cause a server to perform operations such that calculating the likely travel perimeter further comprises evaluating constraints on directions of travel and travel conditions in the vicinity of the current location in calculating the distance in each direction that the mobile device is likely to travel within the predefined period of time.

61. The non-transitory server-readable storage medium of claim 59, wherein the stored server-executable instructions are configured to cause a server to perform operations such that calculating the likely travel perimeter further comprises calculating the distance in each direction that the mobile device is likely to travel within a predefined period of time that is predefined for each geofence.

62. The method of claim 1, wherein executing the instruction includes displaying one or more of an advertisement, promotional coupon, and directions of a sponsor located within a geofence included in the subset of geofences.

63. The method of claim 1, wherein executing the instruction includes transmitting a message to a sponsor located within a geofence included in the subset of geofences informing the sponsor that the mobile computing device has crossed the geofence.

64. The method of claim 1, wherein executing the instruction includes playing a sound to alert a user of the mobile computing device of a proximity of a geofence included in the subset of geofences.

65. The method of claim 11, wherein the instructions include displaying one or more of an advertisement, a promotional coupon, and directions of a sponsor located within a geofence included in the subset of geofences.

66. The method of claim 11, wherein the instructions include transmitting a message to a sponsor located within a geofence included in the subset of geofences informing the sponsor that the mobile computing device has crossed the geofence.

67. The method of claim 11, wherein the instructions include playing a sound to alert a user of the mobile computing device of a proximity of a geofence included in the subset of geofences.

68. The mobile computing device of claim 20, wherein executing the instruction includes displaying one or more of an advertisement, promotional coupon, and directions of a sponsor located within a geofence included in the subset of geofences.

69. The mobile computing device of claim 20, wherein executing the instruction includes transmitting a message to a sponsor located within a geofence included in the subset of geofences informing the sponsor that the mobile computing device has crossed the geofence.

70. The mobile computing device of claim 20, wherein executing the instruction includes playing a sound to alert a user of the mobile computing device of a proximity of a geofence included in the subset of geofences.

71. The server of claim 41, wherein the instructions include displaying one or more of an advertisement, a promotional coupon, and directions of a sponsor located within a geofence included in the subset of geofences.

72. The server of claim 41, wherein the instructions include transmitting a message to a sponsor located within a geofence included in the subset of geofences informing the sponsor that the mobile computing device has crossed the geofence.

73. The server of claim 41, wherein the instructions include playing a sound to alert a user of the mobile computing device of a proximity of a geofence included in the subset of geofences.

74. The method of claim 1, wherein the update perimeter is determined by a density of geofences in a vicinity of the current location.

* * * * *